US012384180B2

(12) United States Patent
Miyasaka et al.

(10) Patent No.: US 12,384,180 B2
(45) Date of Patent: Aug. 12, 2025

(54) OPENABLE COVER AUTOMATIC OPENING MECHANISM AND PRINTING DEVICE

(71) Applicant: SEIKO EPSON CORPORATION, Tokyo (JP)

(72) Inventors: Haruki Miyasaka, Matsumoto (JP); Narihiro Oki, Matsumoto (JP); Keisuke Sasaki, Matsumoto (JP); Hiroki Shinagawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 116 days.

(21) Appl. No.: 18/065,286

(22) Filed: Dec. 13, 2022

(65) Prior Publication Data

US 2023/0191812 A1 Jun. 22, 2023

(30) Foreign Application Priority Data

Dec. 16, 2021 (JP) ................................ 2021-204508

(51) Int. Cl.
*B41J 29/13* (2006.01)

(52) U.S. Cl.
CPC .................................... *B41J 29/13* (2013.01)

(58) Field of Classification Search
CPC ....................................................... B41J 29/13
USPC .................................. 400/691–693; 347/108
See application file for complete search history.

(56) References Cited

U.S. PATENT DOCUMENTS

| | | | | |
|---|---|---|---|---|
| 7,636,530 | B2 * | 12/2009 | Kitamura | G03G 15/50 399/107 |
| 9,352,924 | B2 * | 5/2016 | Hori | B41J 29/02 |
| 10,882,330 | B2 * | 1/2021 | Komagome | B41J 29/13 |
| 2001/0052914 | A1 * | 12/2001 | Lee | B41J 2/16547 347/29 |
| 2005/0069370 | A1 * | 3/2005 | Yamada | B41J 29/54 400/663 |
| 2013/0038188 | A1 * | 2/2013 | Lin | B41J 29/026 312/319.2 |

FOREIGN PATENT DOCUMENTS

| | | |
|---|---|---|
| JP | 2006-239993 | 9/2006 |
| JP | 2007-161369 A | 6/2007 |
| JP | 2010-017998 | 1/2010 |

* cited by examiner

*Primary Examiner* — Leslie J Evanisko
*Assistant Examiner* — Thomas Ray Knief
(74) *Attorney, Agent, or Firm* — WORKMAN NYDEGGER

(57) ABSTRACT

An openable cover automatic opening mechanism includes a lever rotatable about a rotation fulcrum, a locking section that is positioned at one end of the lever and that maintains the openable cover, which is in a closed state and which receives an opening force, in the closed state by locking with the openable cover, and a power receiving section positioned at the other end of the lever for contacting the horizontally moving carriage to receive power of the carriage. The lever rotates when the carriage comes into contact with and presses the power receiving section, and releases maintenance of the closed state of the openable cover by the locking section.

10 Claims, 10 Drawing Sheets

OPENABLE COVER AUTOMATIC OPENING MECHANISM AND PRINTING DEVICE

The present application is based on, and claims priority from JP Application Serial Number 2021-204508, filed Dec. 16, 2021, the disclosure of which is hereby incorporated by reference herein in its entirety.

BACKGROUND

1. Technical Field

The present disclosure relates to an openable cover automatic opening mechanism and a printing device including the same.

2. Related Art

An example of this type of openable cover automatic opening mechanism is disclosed in JP-A-2007-161369. JP-A-2007-161369 describes automatic opening of the front cover using a solenoid operated by passage of electric current.

The arrangement described in JP-A-2007-161369 uses a solenoid, which is costly and prevents space savings.

SUMMARY

In order to overcome the above-described problem, an openable cover automatic opening mechanism according to the present disclosure includes a lever rotatable about a rotation fulcrum, a locking section that is positioned at one end of the lever and that maintains an openable cover, which is in a closed state and which receives a force in an opening direction, in the closed state by locking with the openable cover, and a power receiving section that is positioned at another end of the lever and that contacts a carriage moving in a horizontal direction in order to receive power of the carriage, wherein the lever is rotated by the carriage contacting and pressing the power receiving section, and releases maintenance of the closed state of the openable cover by the locking section.

A printing device according to the present disclosure includes a print head mounted on a carriage, an openable cover that receives a force in an opening direction, and the above described openable cover automatic opening mechanism.

DESCRIPTION OF EMBODIMENTS

Figure 1:
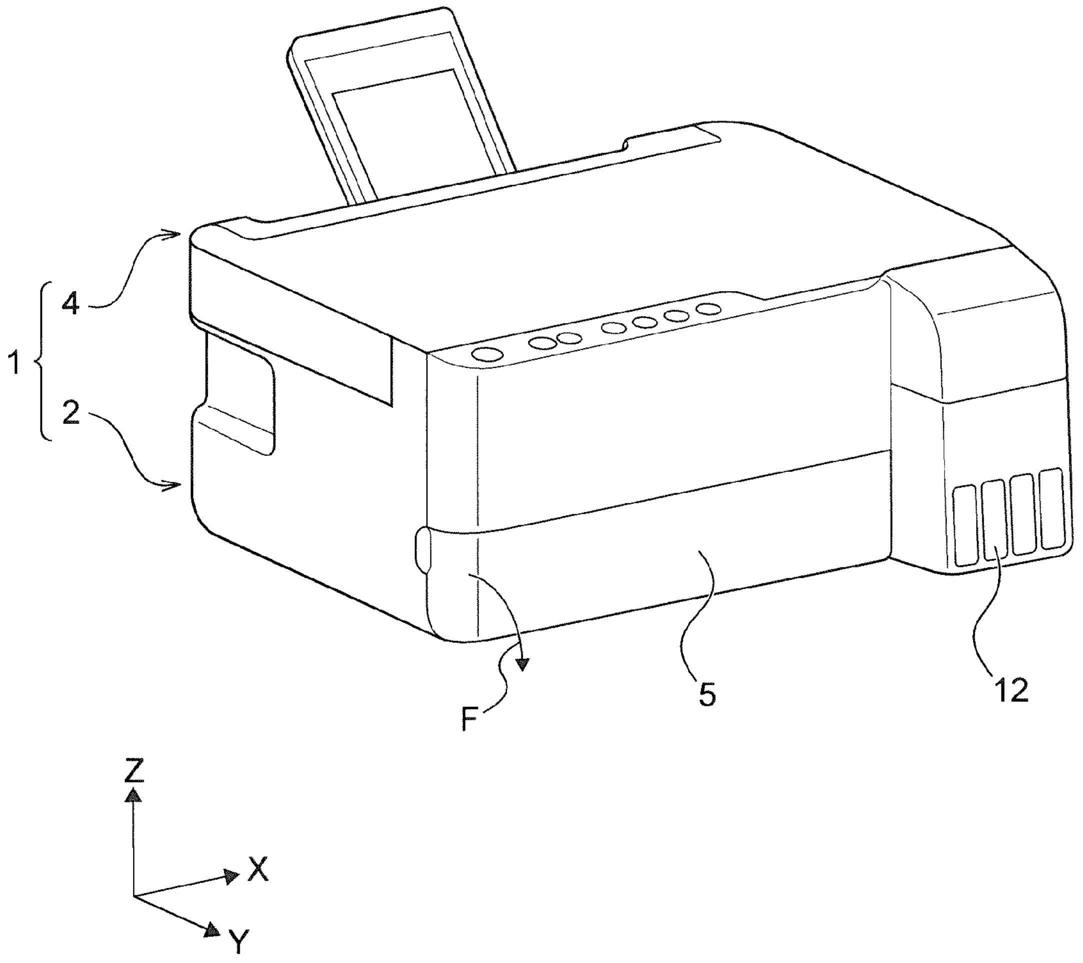
FIG. 1 is an external perspective view of a printing device according to a first embodiment.

The present disclosure will be described briefly.

In order to overcome the above-described problem, an openable cover automatic opening mechanism according to a first aspect of the present disclosure includes a lever rotatable about a rotation fulcrum, a locking section that is positioned at one end of the lever and that maintains an openable cover, which is in a closed state and which receives a force in an opening direction, in the closed state by locking with the openable cover, and a power receiving section that is positioned at another end of the lever and that receives power of a carriage by contacting the carriage moving in a horizontal direction, wherein the lever is rotated by the carriage contacting and pressing the power receiving section, and releases maintenance of the closed state of the openable cover by the locking section.

According to this aspect, the lever is rotated by the carriage contacting and pressing the power receiving section and, by this rotation, releases maintenance of the closed state of the openable cover by the locking section. By this release, the openable cover receives the force F in the opening direction, so the openable cover is shifted from the closed state to the open state by the action of the force. Therefore, since using the power of the carriage makes it unnecessary to add new power, it is possible to realize cost reduction and space saving of the mechanism for automatically opening the openable cover.

An openable cover automatic opening mechanism according to a second aspect of the present disclosure is the openable cover automatic opening mechanism of the first aspect, wherein the force in the opening direction is generated by a self weight moment toward an opening side of the openable cover.

According to this aspect, since the openable cover has a self weight moment toward the opening side, when the locked state by the locking section is released, the openable cover shifts from the closed state to the open state by the self weight. Thus, it is not necessary to provide a mechanism for performing the opening operation of the openable cover, and cost reduction can be realized.

An openable cover automatic opening mechanism according to a third aspect of the present disclosure is the openable cover automatic opening mechanism of the first aspect or the second aspect, further including a sensor for detecting an opened state and a closed state of the openable cover.

According to this aspect, there is provided a sensor for detecting the opened state and the closed state of the openable cover. As a result, it is possible to eliminate an unnecessary movement such as operating the automatic opening mechanism in a state where the openable cover is already opened, thereby improving usability.

An openable cover automatic opening mechanism according to a fourth aspect of the present disclosure is the openable cover automatic opening mechanism of any one of the first aspect to the third aspect, wherein the power receiving section of the lever is a slide section that slides by being pushed by the carriage.

According to this aspect, the power receiving section of the lever is a slide section that slides by being pushed by the carriage. By this, since the lever receives the power of the carriage in such a manner that the slide section slides, the power of the carriage can be effectively utilized.

An openable cover automatic opening mechanism according to a fifth aspect of the present disclosure is the openable cover automatic opening mechanism of the fourth aspect, wherein the slide section has a contacting protrusion for contacting the carriage and when the slide section is pushed by the carriage, the contacting protrusion enters a contacting recess of the carriage.

According to this aspect, when the slide section is pushed by the carriage, the contacting protrusion of the slide section enters a contacting recess of the carriage. By this, the slide section easily moves integrally with the carriage, and it is possible to reduce a concern that the slide section is caught in the carriage.

A printing device according to a sixth aspect of the disclosure is a printing device including a print head mounted on a carriage and an openable cover that receives a force in an opening direction, the printing device including the openable cover automatic opening mechanism according to any one of the first aspect to the fifth aspect.

According to this aspect, it is possible to obtain the above-described effects of the first aspect to the fifth aspect as the printing device.

A printing device according to a seventh aspect of the disclosure is the printing device of the sixth aspect, wherein the carriage reciprocally moves when printing is performed and the automatic opening mechanism is located outside the range of reciprocating movement of the carriage.

According to this aspect, since the automatic opening mechanism is located outside the range of the reciprocating movement of the carriage, the automatic opening mechanism exists independently of a normal printing operation of the printing device. That is, it is possible to provide the automatic opening mechanism in the printing device without influencing the structure for executing the printing operation, and it is possible to easily make models with and without the automatic opening mechanism.

A printing device according to an eighth aspect of the disclosure is the printing device of the sixth aspect or the seventh aspect, wherein opening the openable cover enables operation of at least one of a discharge tray for receiving print medium or a feed cassette for storing print medium.

According to this aspect, it is possible to reduce the risk of occurrence of damage, failure, or the like due to unintentional contact with the discharge tray that receives print medium or a feed cassette for storing print medium.

A printing device according to a ninth aspect of the disclosure is the printing device of any one of the sixth aspect to the eighth aspect, wherein when a closed state of the openable cover is detected, an operation of stopping printing and releasing the closed state of the openable cover is performed.

According to this aspect, even if the openable cover is closed during the printing operation, the openable cover can be opened after the printing operation is stopped.

A printing device according to a tenth aspect of the disclosure is the printing device of any of the sixth aspect to the eighth aspect, wherein an operation of releasing maintenance of the closed state of the openable cover is performed after a main switch of the printing device is turned on and before a printing operation is started.

According to this aspect, since the operation of releasing the maintenance of the closed state of the openable cover is executed at an appropriate timing, it is possible to not have the openable cover open unintentionally.

First Embodiment

Hereinafter, an openable cover automatic opening mechanism and a printing device including the same according to the first embodiment will be described in detail with reference to FIGS. 1 to 9B.

In the following description, three axes orthogonal to each other are referred to as an X axis, a Y axis, and a Z axis, respectively, as shown in the drawings. The Z-axis direction corresponds to a vertical direction, that is, a direction in which gravity acts. The X-axis direction and the Y-axis direction correspond to horizontal directions. In the drawings, directions indicated by arrows of the three axes (X, Y, and Z) are positive directions of the respective directions.

Figure 2:
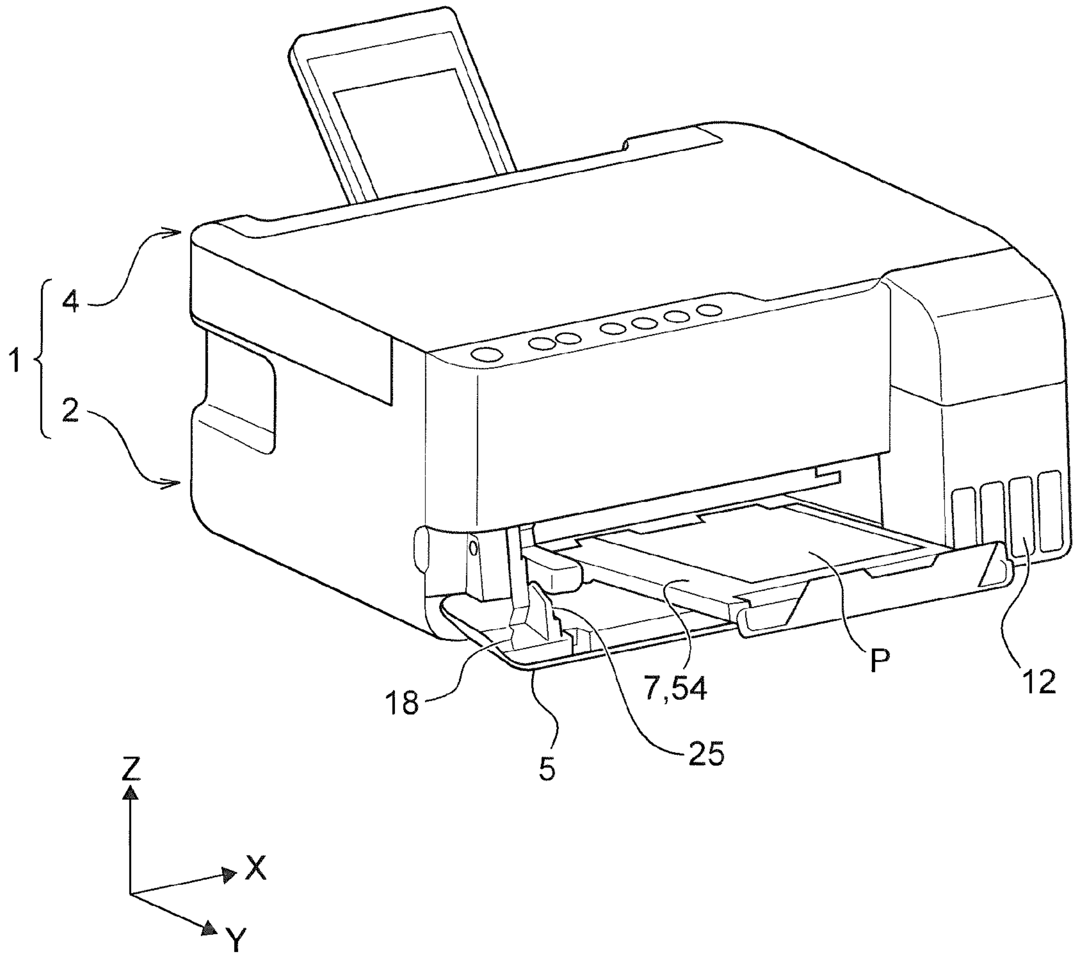
FIG. 2 is an external perspective view of a state in which an openable cover is opened in a first embodiment.
Figure 3:
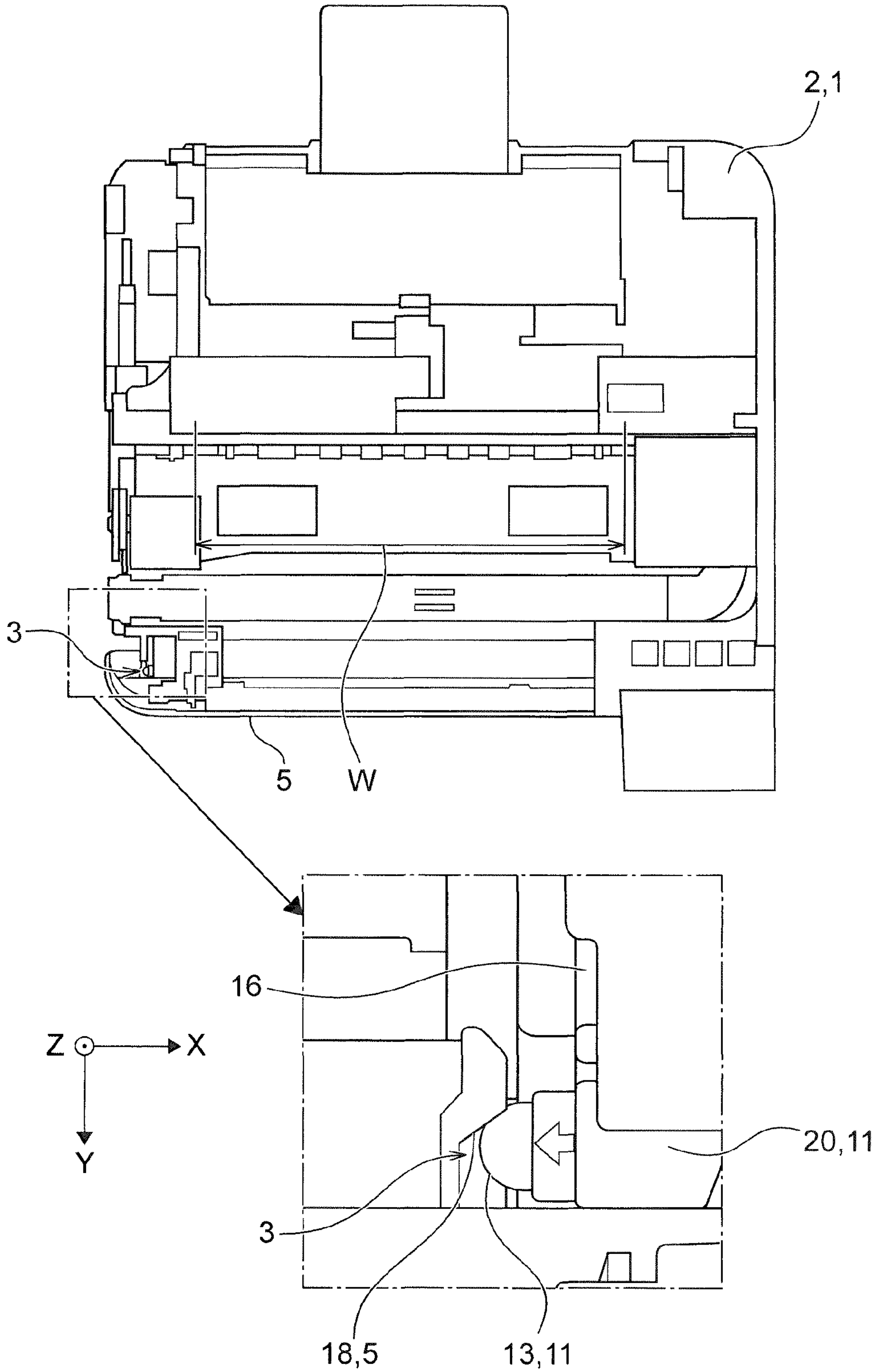
FIG. 3 is an overall plan view showing main sections inside of the first embodiment.

As shown in FIGS. 1 to 3, the printing device 1 according to the present embodiment is provided with an openable cover automatic opening mechanism 3 (FIG. 3). The printing device 1 includes a print head 65 that performs printing on medium P, and includes a carriage 15 that moves in a direction intersecting the transport direction of medium P. FIG. 2 shows a state in which an openable cover 5 located on the front side (+Y direction) of the printing device 1 is open, and a state in which the discharge tray 7 accommodated inside the apparatus is drawn out. A discharge tray 7 that receives a medium P (hereinafter, also referred to as "print medium P") can be operated by opening the openable cover 5. Further, a feed cassette (not shown) for storing the print medium may be configured to be operated.

It should be noted that the printing device 1 is a multifunction machine in which an inkjet printer 2 is located on the lower side and a scanner unit 4 is located on the upper side. The openable cover 5 is disposed at a position adjacent to an ink tank 12 of the printing device 1. The ink tank 12 can be filled with ink.

Figure 5:
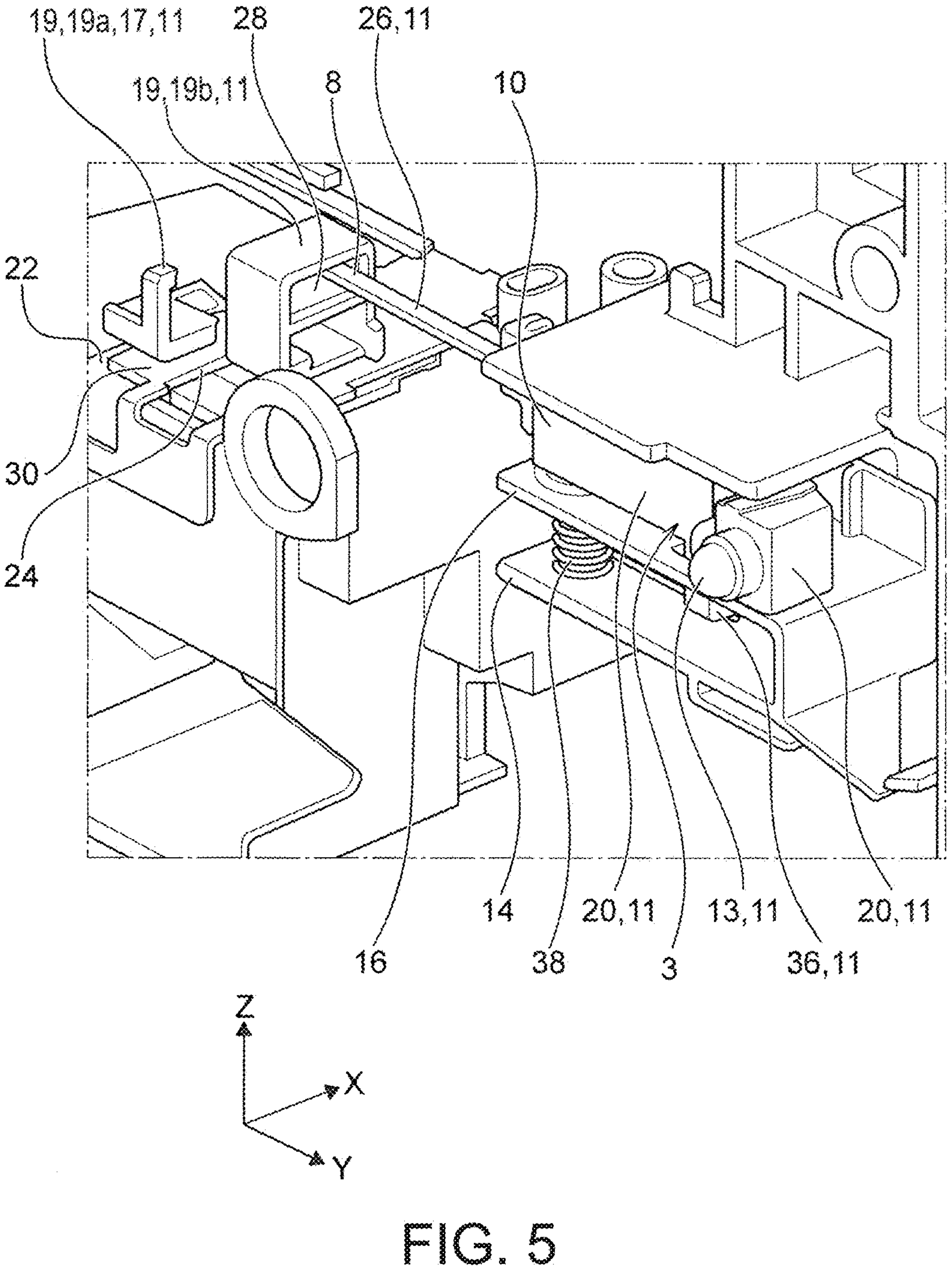
FIG. 5 is an enlarged perspective view of main sections of the first embodiment as viewed obliquely from the front.
Figure 6:
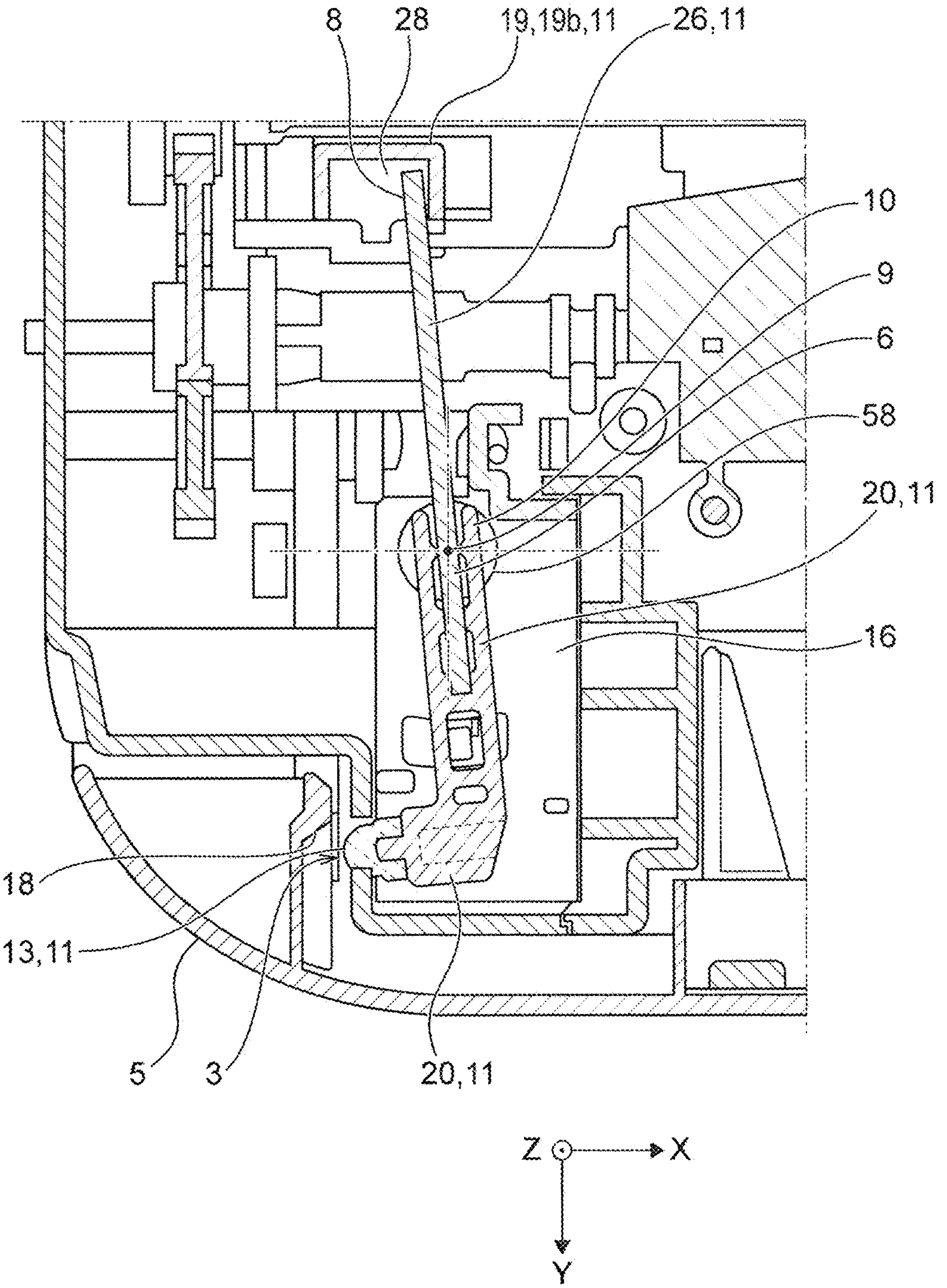
FIG. 6 is an enlarged plan view of main sections of a lever portion of the first embodiment.
Figure 7:
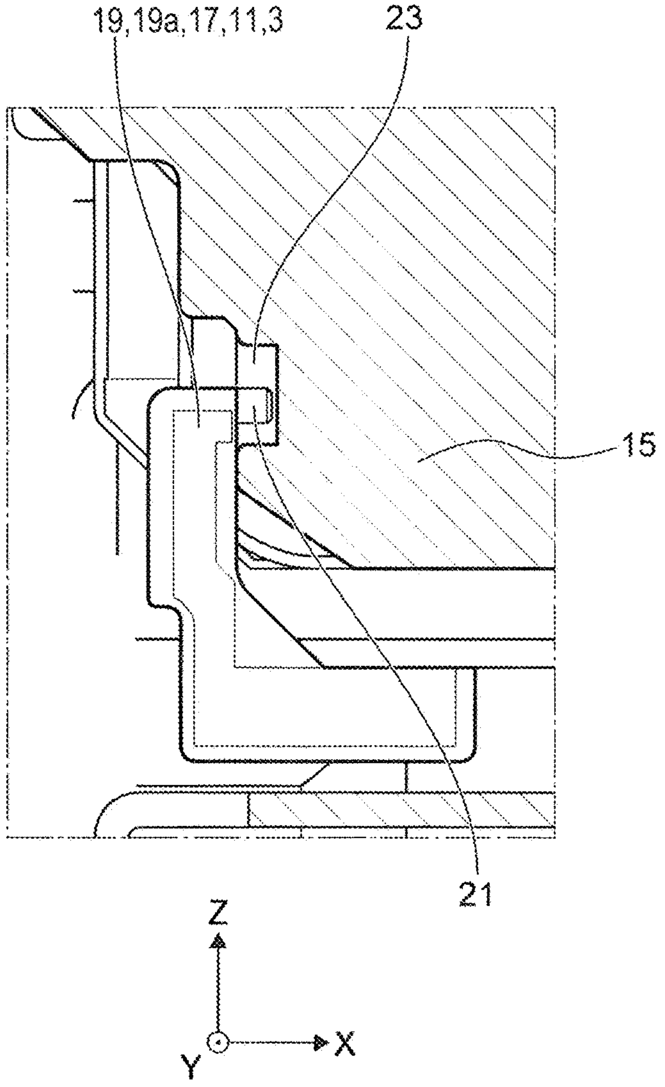
FIG. 7 is a schematic enlarged side sectional view of main sections of a power receiving section of the first embodiment.

As shown in FIGS. 4 to 7, the openable cover automatic opening mechanism 3 includes a lever 11 rotatable about a rotation fulcrum 9, a locking section 13 that is positioned at one end of the lever 11 and that maintains the openable cover 5, which is in a closed state and which receives an opening force F (FIGS. 1 and 8), in the closed state by locking with the openable cover 5, and a power receiving section 17 located at the other end of the lever 11 for receiving power of the carriage 15 by contacting the horizontally moving carriage 15 (FIG. 7).

The lever 11 is configured to rotate when the carriage 15 comes into contact with and presses the power receiving section 17, and to release maintenance of the closed state of the openable cover 5 by the locking section 13.

Each component will be described in detail below.

Lever of Automatic Opening Mechanism

Figure 4:
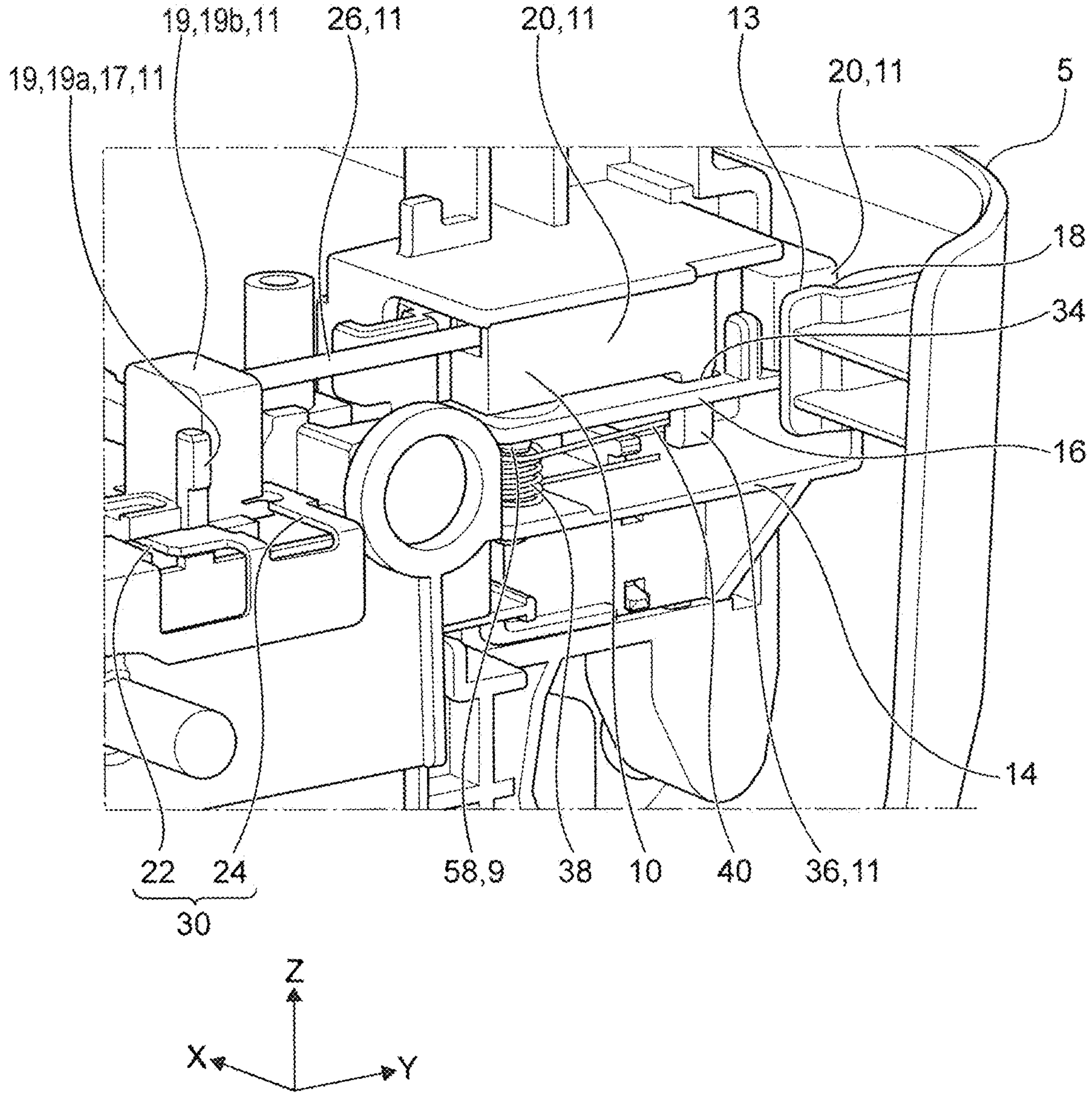
FIG. 4 is an enlarged perspective view of main sections of the first embodiment as viewed obliquely from the rear.

In the present embodiment, as shown in FIGS. 4 to 6, the lever 11 has a shape extending in the Y-axis direction, which is a horizontal direction.

One end of the lever 11 has a locking section 13 for locking with a lock section 18 (FIGS. 2 to 4 and 6) of the openable cover 5 while in the closed state. Note that FIG. 6 shows a state in which the locking section 13 of the lever 11 is disengaged from the lock section 18 of the openable cover 5. The locking section 13 is formed in a convex curved surface shape, with the −X direction as the direction in which it protrudes, and is formed by integral molding with a resin locking section body 20, which extends in the Y-axis direction. The locking section 13 is provided on a side surface of the +Y direction tip end portion of the locking section body 20.

The power receiving section 17 for receiving the power of the moving carriage 15 is provided at the other end of the lever 11. In the present embodiment, the power receiving section 17 is constituted by a slide section 19 that slides by being pushed by the carriage 15. The slide section 19 includes two portions 19*a* and 19*b* whose bottom surfaces are guided by two guide grooves 22 and 24, respectively, (FIG. 5) in the bottom surface of the frame 30. The two portions 19*a* and 19*b* of the slide section 19 are integrally connected to each other and integrally move in the X direction, which is the movement direction of the carriage 15.

The slide section 19*a* guided by the guide groove 22 is configured as the power receiving section 17.

In this embodiment, the slide section 19*b* guided by the guide groove 24 is connected to the locking section body 20 via a power transmission shaft 26 made of metal. One end 6 (FIG. 6) of the power transmission shaft 26 is integrally connected and fixed to the proximal end 10 of the locking section body 20, and the other end 8 is inserted into the recess 28 of the slide section 19*b* and is connected in a non-fixed state in contact with the inner surface of the recessed portion 28.

When the integrated slide section 19*b* is moved in the −X direction by the slide section 19*a* being pushed by the carriage 15, the other end 8 of the power transmission shaft 26 moves in a state of being in contact with the inner surface of the recess 28. By this, the lever 11 can rotate with respect to the rotation fulcrum 9. That is, the linear motion of the carriage 15 in the horizontal direction is converted into the rotational motion of the lever 11 and transmitted.

Rotation Structure of the Lever of the Automatic Opening Mechanism

The lever 11 is rotatably attached in a horizontal plane on a rotation fulcrum shaft 58, which makes the rotation fulcrum 9. The rotation fulcrum 9 is constituted by the axial center of the rotation fulcrum shaft 58. In the present embodiment, the rotation fulcrum shaft 58 is fixed to the lower plate 14 and the upper plate 16, which are device structural members, oriented extending in the vertical direction.

The locking section body 20 of the lever 11 is positioned on an upper surface 32 of the upper plate 16, and a bottom part of the base proximal end 10 is rotatably connected to the rotation fulcrum shaft 58. A through hole 34 (FIG. 4) is formed in the upper plate 16 near the locking section 13, and a protrusion 36 provided on the locking section body 20 is inserted into the through hole 34 in a penetrating state. The through hole 34 is formed to have a size and a shape that allow the locking section body 20 to rotate around the rotation fulcrum 9 at the proximal end 10 side.

A helical torsion spring 38 (FIG. 4) is provided between the lower plate 14 and the upper plate 16, and one end 40 of the helical torsion spring 38 is locked in the protrusion 36 of the locking section body 20. By this, the locking section body 20 is configured to receive spring force of the helical torsion spring 38 and rotate in a direction in which the locking section 13 locks to the lock section 18 of the openable cover 5.

As shown in FIG. 7, in the present embodiment, the slide section 19*a* has a contacting protrusion 21 for contacting the carriage 15, and the carriage 15 is provided with a contacting recess 23 at a position that comes into contact with the contacting protrusion 21. When the slide section 19*a* of the lever 11 is pushed by the carriage 15, the contacting protrusion 21 enters the contacting recess 23, and the slide section 19*a* is easily moved integrally with the carriage 15.

Figure 8:
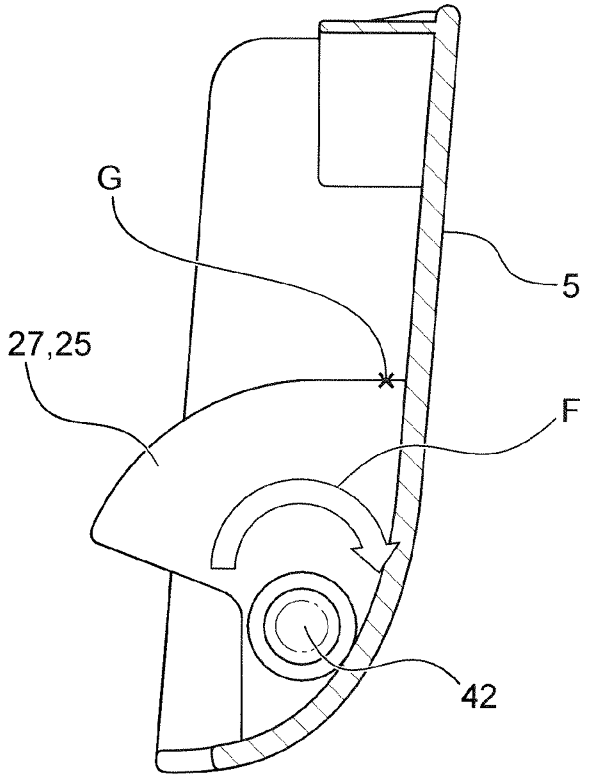
FIG. 8 is an enlarged side sectional view of the openable cover of the first embodiment.

Further, as shown in FIG. 8, in the present embodiment, the openable cover 5 is formed to have a self weight moment toward the opening side. Specifically, the position of the center of gravity G of the openable cover 5 is set with respect to the opening and closing movement fulcrum 42 so that the openable cover 5 opens by its own weight.

That is, since the force F in the opening direction is generated by the self weight of the openable cover 5, when the closing state of the openable cover 5 is released, the openable cover 5 opens automatically by operation of the self weight.

The force F in the opening direction is not limited to a structure using the self weight moment. For example, the force F in the opening direction may be applied using the elasticity of a spring.

Figure 9A:
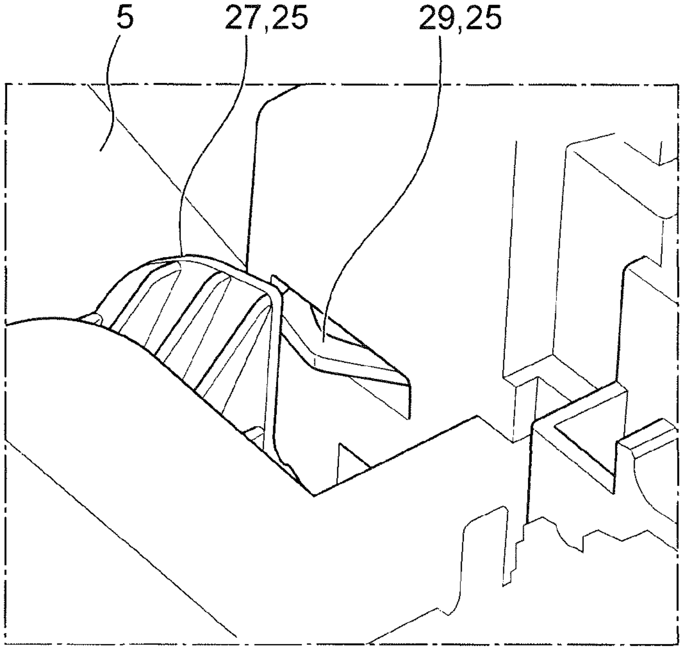
FIGS. 9A and 9B are perspective views of main sections of a sensor portion of the first embodiment.
Figure 9B:
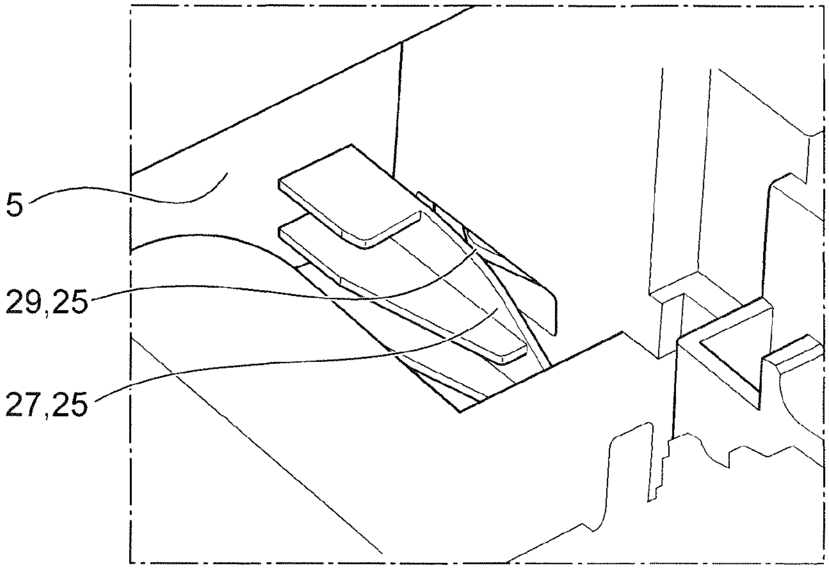

As shown in FIGS. 9A and 9B, in the present embodiment, a sensor 25 is provided for detecting an opened state and a closed state of the openable cover 5. In this case, the sensor 25 is composed of an operation piece 27 provided on the inner surface of the openable cover 5 and a detection piece 29 provided on a device structural member of the printing device 1 in a state of being pressed in the outward direction.

FIG. 9A corresponds to a state in which the detection of the sensor 25 is in an OFF state. That is, since the operation piece 27 does not push against the detection piece 29, the sensor 25 detects that the openable cover 5 is open. A range in which the sensor 25 detects that the openable cover 5 is open is set to an angle at which the discharged print medium will not jam even if the opening of the openable cover 5 stops halfway. Here, the angle is set to 70 degree.

FIG. 9B corresponds to a state in which the detection of the sensor 25 is in an ON state. That is, since the operation piece 27 pushes against the detection piece 29, the sensor 25 detects that the openable cover 5 is closed.

In the present embodiment, the operation of releasing maintenance of the closed state of the openable cover 5 is controlled to be executed after the main switch of the printing device 1 is turned on and before a printing operation is started. The controller (not shown) is configured to execute the releasing operation as triggered by a main switch of the printing device 1 turning ON.

That is, the operation of releasing the maintenance of the closed state of the openable cover 5 is executed at an appropriate timing.

Alternatively, when the closed state of the openable cover 5 is detected, the printing operation may be stopped, and an operation of releasing the closed state of the openable cover 5 may be performed. Even if the openable cover 5 is closed during the printing operation, the openable cover 5 can be opened after the printing operation is stopped, and the printing operation can be resumed.

In addition, in the present embodiment, the carriage 15 reciprocally moves when printing is performed, and the openable cover automatic opening mechanism 3 is positioned outside the range W of the reciprocation of the carriage 15.

Specifically, as shown in FIG. 3, the openable cover automatic opening mechanism 3 is disposed outside the range W of the reciprocating movement of the carriage 15 when the carriage 15 performs printing. That is, the automatic opening mechanism 3 is provided in the printing device 1 so as not to influence the structure for executing the printing operation.

Movement of Carriage is Regulated by Wall Member

Figure 10:
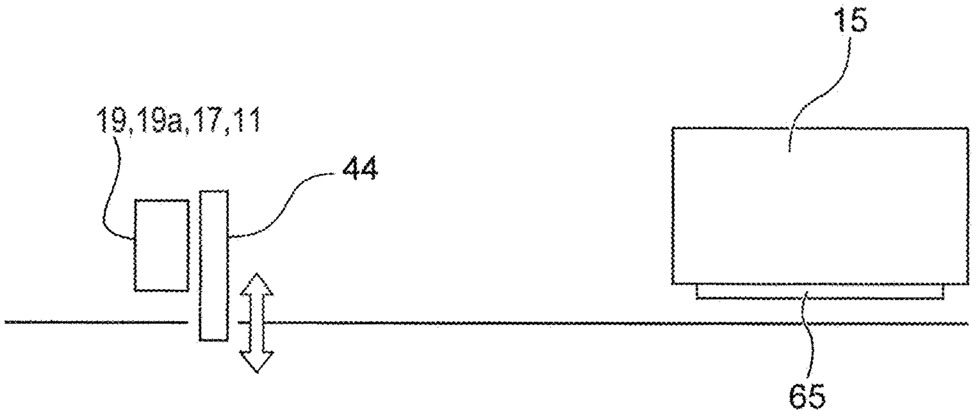
FIG. 10 is a schematic view of a structure in which a wall member is retractably provided in front of the lever of the first embodiment.

As shown in FIG. 10, in the present embodiment, a wall member 44 is provided in front of the power receiving section 17 of the lever 11, that is, in front of the slide section 19*a*, so as to be able to protrude and retract in the vertical direction. When the carriage 15 is moved to operate the automatic opening mechanism 3 to open the openable cover 5, the wall member 44 is in a retracted state, that is, lowered downward out of the way.

On the other hand, when the automatic opening mechanism 3 is not operated, the wall member 44 is in the protruding state, that is, in the raised position. For example, in a case where the carriage 15 is moved in order to detect the position of the carriage 15, the position detection is performed by bringing the carriage 15 into contact with the wall member 44. In this case, since the carriage 15 touches the wall member 44 but does not touch the power receiving section 17 of the lever 11, it is possible to reduce the possibility of the automatic opening mechanism 3 being unintentionally operated.

The wall member 44 can be projected and retracted using a power source such as a motor included in the printing device 1. Reference numeral 65 denotes a print head.

Movement Range of Carriage Controlled According to Current Value

Figure 11:
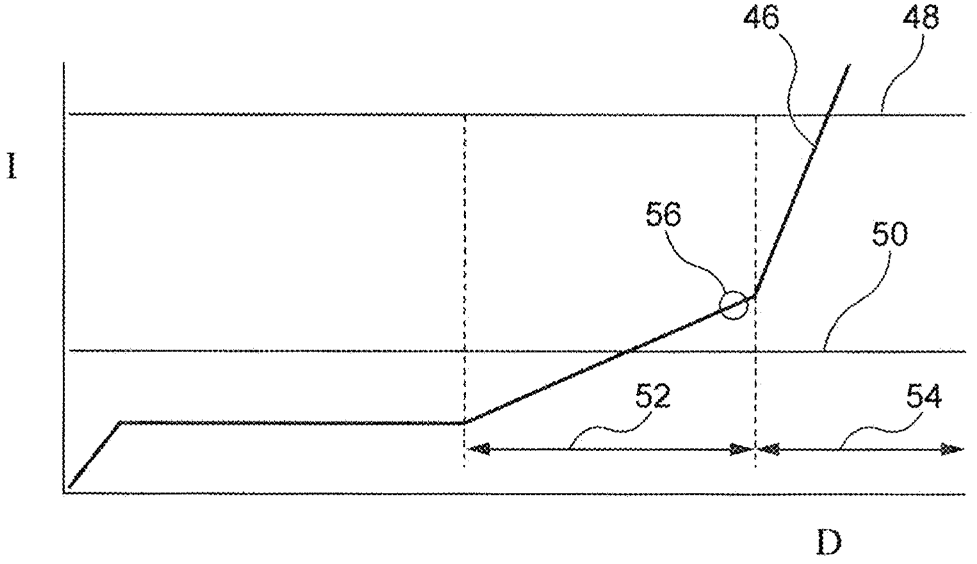
FIG. 11 is a graph showing a threshold value of a current value for controlling a movement range of a carriage in the first embodiment.

FIG. 11 is a graph showing a threshold value of a current value for controlling the movement range of the carriage 15. The horizontal axis represents a movement distance D of the carriage 15 from the origin, and the vertical axis represents the current value I flowing to the carriage 15.

When the carriage 15 starts to move from the origin and comes into contact with the power receiving section 17 of the lever 11 of the automatic opening mechanism 3, the carriage 15 moves against the spring force of the helical torsion spring 38, so that the current value I flowing through the carriage 15 starts to increase. Reference numeral 46 in the drawing indicates a change in the current value I flowing through the carriage 15 at that time.

Reference numeral 56 denotes a position of the carriage 15 at which the maintenance of the closed state of the openable cover 5 is released, that is, a position at which the locking section 13 of the lever 11 is disengaged from the lock section 18 and the openable cover 5 starts to shift to the open state. Reference numeral 50 denotes a first threshold value, and reference numeral 48 denotes a second threshold value. The first threshold value 50 is set in a region 52 from a position where the carriage 15 comes into contact with the power receiving section 17 of the lever 11 to the position 56 where the openable cover 5 starts to open, and the second threshold value 48 is set in a region 54 after the openable cover 5 starts to open.

As can be understood from FIG. 11, the region 52 is a region in which the carriage 15 is in contact with the power receiving section 17 of the lever 11 in a portion closer to the origin before the position 56, but the rotation amount of the lever 11 is still small, and the openable cover 5 is maintained in the closed state. The first threshold value 50 set in the region 52 can be used to detect the position of the carriage 15 without causing the automatic opening mechanism 3 to operate. In FIG. 10, detection of the position of the carriage 15 is performed by bringing the carriage 15 into contact with the wall member 44, but in FIG. 11, detection is performed by detecting a first threshold value 50.

On the other hand, since the openable cover 5 starts to open in the region 54, the second threshold value 48 set in the region 54 can be used to detect the open state of the openable cover 5.

Operation of Openable Cover Automatic Opening Mechanism

In a state shown in FIG. 1 where the openable cover 5 is closed, first, the carriage 15 moves in the −X direction, comes into contact with and further pushes the power receiving section 17 on the slide section 19*a* of the lever 11. The lever 11 receives the power of the movement of the carriage in the −X direction, and rotates around the rotation fulcrum 9. By this rotation of the lever 11, the locking section 13 of the lever 11 is disengaged from the lock section 18 of the openable cover 5. Thereafter, the openable cover 5 opens under by its own weight to reach the state shown in FIG. 2. In FIG. 2, the discharge tray 7 is further pulled out.

Description of Effects of the Embodiment (1) According to the automatic opening mechanism 3 of the present embodiment, the lever 11 rotates when the carriage 15 comes into contact with and presses the power receiving section 17, and rotation of the lever 11 releases maintenance of the closed state of the openable cover 5 by the locking section 13. By this release, the openable cover 5 receives the force F in the opening direction, so the openable cover 5 is shifted from the closed state to the open state by the action of the force F. Therefore, since using the power of the carriage 15 makes it unnecessary to add new power, it is possible to realize cost reduction and space saving of the mechanism for automatically opening the openable cover 5.

(2) According to the present embodiment, since the openable cover 5 has a self weight moment toward the opening side, when the locked state by the locking section 13 is released, the openable cover 5 shifts from the closed state to the open state by the self weight. Thus, it is not necessary to provide a mechanism for performing the opening operation of the openable cover 5, and cost reduction can be realized.

(3) Further, according to the present embodiment, a sensor 25 is provided for detecting an opened an opened state and a closed state of the openable cover 5. As a result, it is possible to eliminate an unnecessary movement such as operating the automatic opening mechanism 3 in a state where the openable cover 5 is already opened, thereby improving usability.

(4) According to the embodiment, the power receiving section 17 of the lever 11 is the slide section 19 (19*a*, 19*b*), which slides by being pushed by the carriage 15. By this, since the lever 11 receives the power of the carriage 15 in such a manner that the slide section 19 slides, the power of the carriage 15 can be effectively utilized.

(5) According to the embodiment, when the slide section 19*a* is pushed by the carriage 15, the contacting protrusion 21 of the slide section 19*a* enters the contacting recess 23 of the carriage 15. By this, the slide section 19*a* easily moves integrally with the carriage 15, and it is possible to reduce a concern that the slide section 19*a* is caught in the carriage 15.

(6) According to the printing device 1 of the embodiment, the printing head 65 mounted on the carriage 15 and the openable cover 5 receiving the force F in the opening direction are provided, and the openable cover automatic opening mechanism 3 having the configuration described above is provided. Accordingly, it is possible to obtain the respective effects of the automatic opening mechanism 3 described above as the printing device 1.

(7) According to the embodiment, the carriage 15 reciprocally moves when printing is performed, and the automatic opening mechanism 3 is positioned outside the range W of the reciprocation of the carriage 15. As described above, the automatic opening mechanism 3 exists independently of the normal printing operation of the printing device 1. That is, it is possible to provide the automatic opening mechanism 3 in the printing device 1 without influencing the structure for executing the printing operation, and it is possible to easily make models with and without the automatic opening mechanism 3.

(8) According to the present embodiment, by opening the openable cover 5, the discharge tray 7 or the like for receiving the print medium P can be operated. Accordingly, it is possible to reduce the risk of occurrence of damage, failure, or the like due to unintentional contact with the discharge tray 7 or the like that receives the print medium P.

(9) According to the present embodiment, when the closed state of the openable cover 5 is detected during a printing operation, the printing operation may be stopped, and an operation of releasing the closed state of the openable cover 5 is performed. Thus, even when the openable cover 5 is closed during the printing operation, the openable cover 5 can be opened after the printing operation is stopped, and the printing operation can be resumed.

(10) According to the present embodiment, the operation of releasing maintenance of the closed state of the openable cover 5 is after the main switch of the printing device 1 is turned on and before a printing operation is started. Accordingly, since the operation of releasing the maintenance of the closed state of the openable cover 5 is executed at an appropriate timing, it is possible to not have the openable cover 5 open unintentionally.

Other Embodiments

The openable cover automatic opening mechanism 3 and the printing device 1 according to the present disclosure are based on the configuration of the above-described embodiment, but it is of course possible to change or omit a partial configuration without departing from the gist of the present disclosure.

In the above-described embodiment, the lever 11 is configured by integrally assembling the separate bodies of the locking section body 20 made of resin and the power transmission shaft 26 made of metal, but the locking section body 20 and the power transmission shaft 26 may be formed by integral molding of resin, for example. Further, the slide section 19 may be integrally formed with the lever 11.

In the above-described embodiment, the power receiving section 17 is configured as the slide section 19, but the carriage 15 may be directly brought into contact with the other end 8 of the power transmission shaft 26. In this case, it is desirable that a structure of a portion which comes into contact with the carriage 15 and receives power is stably brought into contact with the carriage 15.

What is claimed is:

1. An openable cover automatic opening mechanism comprising:

a lever rotatable about a rotation fulcrum having an axial center, the lever extending in a horizontal direction from a first end to a second end;

a locking section that is positioned at the first end of the lever and that maintains an openable cover, which is in a closed state and which receives a force in an opening direction, in the closed state by locking with the openable cover; and a power receiving section that is positioned at the second end of the lever and that receives power of a carriage by contacting the carriage moving in a horizontal direction, a power transmission shaft of the lever being received within a recess of the power receiving section, wherein the lever is rotated about the axial center by the carriage contacting and pressing the power receiving section, and releases maintenance of the closed state of the openable cover by the locking section, the locking section and the power receiving section each being rotated about the axial center of the rotation fulcrum as the lever is rotated about the axial center.

2. The openable cover automatic opening mechanism according to claim 1, wherein the force in the opening direction is generated by a self weight moment toward an opening side of the openable cover.

3. The openable cover automatic opening mechanism according to claim 1, further comprising:

a sensor for detecting an opened state and the closed state of the openable cover.

4. The openable cover automatic opening mechanism according to claim 1, wherein the power receiving section of the lever is a slide section that slides by being pushed by the carriage.

5. The openable cover automatic opening mechanism according to claim 4, wherein the slide section has a contacting protrusion for contacting the carriage and when the slide section is pushed by the carriage, the contacting protrusion enters a contacting recess of the carriage.

6. A printing device comprising:

a print head mounted on a carriage;

an openable cover that receives a force in an opening direction; and the openable cover automatic opening mechanism according to claim 1.

7. The printing device according to claim 6, wherein the carriage reciprocally moves when printing is performed and the automatic opening mechanism is located outside a range of reciprocating movement of the carriage.

8. The printing device according to claim 6, wherein opening the openable cover enables operation of at least one of a discharge tray for receiving print medium or a feed cassette for storing print medium.

9. The printing device according to claim 6, wherein when the closed state of the openable cover is detected, an operation of stopping printing and releasing the closed state of the openable cover is performed.

10. The printing device according to claim 6, wherein an operation of releasing maintenance of the closed state of the openable cover is performed after a main switch of the printing device is turned on and before a printing operation is started.

* * * * *